United States Patent
Bratvedt et al.

(10) Patent No.: US 11,156,742 B2
(45) Date of Patent: Oct. 26, 2021

(54) RESERVOIR SIMULATION USING AN ADAPTIVE DEFLATED MULTISCALE SOLVER

(71) Applicants: Schlumberger Technology Corporation, Sugar Land, TX (US); Chevron U.S.A. Inc., San Ramon, CA (US); Total SA, Courbevoie (FR)

(72) Inventors: Kyrre Bratvedt, Katy, TX (US); Alexander Lukyanov, Cambridge, MA (US); Hadi Hajibeygi, Delft (NL); Kees Vuik, Delft (NL)

(73) Assignees: Schlumberger Technology Corporation, Sugar Land, TX (US); Chevron U.S.A. Inc., San Ramon, CA (US); Total SA, Courbevoie (FR)

(*) Notice: Subject to any disclaimer, the term of this patent is extended or adjusted under 35 U.S.C. 154(b) by 761 days.

(21) Appl. No.: 15/762,096

(22) PCT Filed: Oct. 6, 2016

(86) PCT No.: PCT/US2016/055609
§ 371 (c)(1),
(2) Date: Mar. 21, 2018

(87) PCT Pub. No.: WO2017/062531
PCT Pub. Date: Apr. 13, 2017

(65) Prior Publication Data
US 2020/0241167 A1    Jul. 30, 2020

Related U.S. Application Data

(60) Provisional application No. 62/239,343, filed on Oct. 9, 2015.

(51) Int. Cl.
*G01V 99/00* (2009.01)
*G06F 30/23* (2020.01)
(Continued)

(52) U.S. Cl.
CPC .......... *G01V 99/005* (2013.01); *E21B 49/00* (2013.01); *G06F 17/18* (2013.01); *G06F 30/23* (2020.01);
(Continued)

(58) Field of Classification Search
CPC ...... G06F 30/23; G06F 17/18; G06F 2111/10; G06F 30/00; E21B 43/00; E21B 2200/20; E21B 49/00; G01V 99/005
(Continued)

(56) References Cited

U.S. PATENT DOCUMENTS

2010/0004908 A1* 1/2010 Lunati .................. G06F 30/23
703/2
2010/0057413 A1* 3/2010 Lee ...................... G06F 30/20
703/2
(Continued)

FOREIGN PATENT DOCUMENTS

WO        2008/054610 A2    5/2008

OTHER PUBLICATIONS

Burrage, Kevin et al, "A Deflation Technique for Linear Systems of Equations", Jul. 1997, SIAM Journal on Scientific Computing, ResearchGate. (Year: 1997).*

(Continued)

*Primary Examiner* — Cedric Johnson

(57) ABSTRACT

Systems, computer-readable media, and methods are described for performing a reservoir simulation by obtaining reservoir data, obtaining simulation parameters, determining partial differential equations based on the simulation parameters, and performing a timestep of the reservoir simulation based on the reservoir data and the partial differential equations by removing an effect of long coherent structures with high contrasts, such as fractures, faults, high and low permeability channels, or shale layers, from the partial (Continued)

differential equations to generate adapted partial differential equations, and performing an algebraic multiscale method on the adapted partial differential equations to generate an approximated solution. The approximated solution can be used in a subsequent timestep of the reservoir simulation.

23 Claims, 6 Drawing Sheets

(51) Int. Cl.
    *E21B 49/00*         (2006.01)
    *G06F 17/18*         (2006.01)
    *G06F 111/10*       (2020.01)

(52) U.S. Cl.
    CPC ....... *E21B 2200/20* (2020.05); *G06F 2111/10* (2020.01)

(58) Field of Classification Search
    USPC .................................................. 703/2, 6, 10
    See application file for complete search history.

(56) References Cited

U.S. PATENT DOCUMENTS

| | | |
|---|---|---|
| 2012/0041729 A1 | 2/2012 | Da Fontoura et al. |
| 2012/0136636 A1 | 5/2012 | Kleine et al. |
| 2012/0158380 A1* | 6/2012 | Hajibeygi ............... G06F 17/11 703/2 |
| 2013/0035913 A1* | 2/2013 | Mishev .................. G01V 11/00 703/2 |
| 2013/0166264 A1 | 6/2013 | Usaki et al. |
| 2015/0168598 A1 | 6/2015 | Fleming |
| 2016/0342718 A1* | 11/2016 | Moyner .................. E21B 47/06 |

OTHER PUBLICATIONS

International Preliminary Report on Patentability for the equivalent International patent application PCT/US2016/055609 dated Apr. 19, 2018.
Aames, et al., "Mixed Multiscale Finite Element Methods Using Limited Global Information," Multiscale Modeling & Simulation, vol. 7, Issue 2, pp. 655-676, 2008.
Christie, et al., "Tenth SPE Comparative Solution Project: A Comparison of Upscaling Techniques," SPE 66599, presented at the SPE Symposium on Reservoir Simulation, Houston, Feb. 2001.
Chu, et al., "Flow based oversampling technique for multiscale finite element methods," Advances in Water Resources, 31:599-608, 2008.
Cortinovis, et al., "Iterative Galerkin-enriched multiscale finite-volume method," Journal of Computational Physics, 277:248-267, 2014.
Cusini, et al., "A constrained pressure residual multiscale (cpr-ms) compositional solver," SPE Journal, ECMOR XIV—14th European conference on the mathematics of oil recovery, 2014.
Dolean, et al., "Analysis of a two-level schwarz method with coarse spaces based on local dirichlet-to-neumann maps," Journal of Computer Methods in Applied Mathematics, vol. 12, No. 4, pp. 391-414, 2012.
Dolean, et al., "Two-Level Domain Decomposition Methods for Highly Heterogeneous Darcy Equations. Connections with Multiscale Methods," Oil & Gas Science and Technology, Rev. IFP Energies nouvelles, vol. 69, No. 4, pp. 731-752, 2014.
Dostal, "Conjugate gradient method with preconditioning by projector," International Journal of Computer Mathematics, vol. 23, Issue, 3-4, pp. 315-323, 1988.
Durlofsky, et al., "An adaptive local-global multiscale finite volume element method for two-phase flow simulations," Advances in Water Resources, 30:576-588, 2007.

Efendiev, et al., "Multiscale Finite Element Methods: Theory and Applications," Springer, 2009.
Efendiev et al. "Accurate multiscale finite element methods for two-phase flow simulations," Journal of Computational Physics, vol. 220, pp. 155-174, 2006.
Efendiev, et al., "Multiscale finite element methods for high-contrast problems using local spectral basis functions," Journal of Computational Physics, vol. 230, pp. 937-955, 2011.
Frank, et al., "On the construction of deflation-based preconditioners,": SIAM Journal on Scientific Computing, vol. 23, No. 2, pp. 442-462, 2001.
Hajibeygi, et al., "Multiscale finite-volume method for parabolic problems arising from compressible multiphase flow in porous media," Journal of Computational Physics, vol. 228, pp. 5129-5147, 2009.
Hajibeygi, et al., "Adaptive iterative multiscale finite volume method," Journal of Computational Physics, vol. 230, No. 3, pp. 628-643, 2011.
Hajibeygi, et al., "Compositional Multiscale Finite-Volume Formulation," SPE Reservoir Simulation Symposium, Feb. 18-20, 2013, pp. 316-326.
Hajibeygi, et al., "Iterative multiscale finite-volume method," Journal of Computational Physics, vol. 227, pp. 8604-8621, 2008.
Hajibeygi, et al., "Accurate and Efficient Simulation of Multiphase Flow in a Heterogeneous Reservoir by Using Error Estimate and Controlin the Multiscale Finite-Volume Framework," SPE Journal, 17(4):1071-1083, 2012.
Hou, et al., "A Multiscale Finite Element Method for Elliptic Problems in Composite Materials and Porous Media," Journal of Computational Physics, vol. 134, pp. 169-189, 1997.
Jenny, et al., "Multi-scale finite-volume method for elliptic problems in subsurface flow simulation," Journal of Computational Physics, vol. 187, pp. 47-67, 2003.
Jenny, et al., "Adaptive fully implicit multi-scale finite-volume method for multi-phase flow and transport in heterogeneous porous media," Journal of Computational Physics, vol. 217, pp. 627-641, 2006.
Killough, "Ninth SPE Comparative Solution Project: A Reexamination of Black-Oil Simulation," SPE-29110-MS, presented at the SPE Symposium on Reservoir Simulation, San Antonio, Texas, Feb. 1995.
Lunati et al., "Treating Highly Anisotropic Subsurface Flow with the Multiscale Finite-Volume Method," SIAM Multiscale Modeling & Simulation, vol. 6, No. 1, pp. 308-318, 2007.
Lunati, et al., "An Operator Formulation of the Multiscale Finite-Volume Method with Correction Function," Multiscale Modeling & Simulation, vol. 8, No. 1, pp. 96-109, 2009.
Lunati et al., "An iterative multiscale finite volume algorithm converging to exact solution," Journal of Computational Physics, vol. 230, No. 5, pp. 1849-1864, 2011.
Mansfield, "On the Conjugate Gradient Solution of the Schur Complement System Obtained from Domain Decomposition," SIAM Journal on Numerical Analysis, vol. 27, No. 6, pp. 1612-1620, 1990.
Mansfield, "Damped Jacobi Preconditioning and Coarse Grid Deflation for Conjugate Gradient Iteration on Parallel Computers," SIAM Journal on Scientific & Statistical Computing, vol. 12, No. 6, pp. 1314-1323, 1991.
Nataf, et al., "A coarse space construction based on local dirichlet-to-neumann maps," SIAM Journal on Scientific Computing, vol. 33, No. 4, pp. 623-1642, 2011.
Nicolaides, "Deflation of conjugate gradients with applications to boundary value problems," SIAM Journal on Numerical Analysis, vol. 24, No. 2, pp. 355-365, 1987.
Nordbotten, et al., "On the relationship between the multiscale finit volume method and domain decomposition preconditioners," Computational Geosciences, vol. 12, No. 3, pp. 367-376, 2008.
Sandvin, et al., "Multiscale mass conservative domain decomposition preconditioners for elliptic problems on irregular grids," Computational Geosciences, vol. 15, No. 3, pp. 587-602, 2011.
Stuben, et al., "Algebraic Multigrid Methods (AMG) for the Efficient Solution of Fully Implicit Formulations in Reservoir Simulation," SPE 105832, presented at the 2007 Reservoir Simulation Symposium, 2007.

(56) References Cited

OTHER PUBLICATIONS

Tang, "Two-level preconditioned conjugate gradient methods with applications to bubbly flow problems," PhD Thesis TU Delft, 2008.
Tang, et al., "New Variants of Deflation Techniques for Pressure Correction in Bubbly Flow Problems," Journal of Numerical Analysis, Industrial and Applied Mathematics, vol. 2, No. 3-4, pp. 227-249, 2007.
Tang, et al., "Efficient Deflation Methods Applied to 3-D Bubbly Flow Problems," Electronic Transactions on Numerical Analysis, vol. 26, pp. 330-349, 2007.
Tene, et al., "Compressible algebraic multiscale solver (cams)," Proceedings of the 14th European Conference on the Mathematics of Oil Recovery (ECMOR), Catania, Sicily, Italy, 2014.
Vermolen, et al., "Deflation in preconditioned conjugate gradient methods for finite element problems," In M. Krizek, P. Neittaanmaki, R. Glowinski, and S. Korotov, editors, Conjugate Gradient and Finite Element Methods. Springer, Berlin, 2004, pp. 103-129, 2004.
Vuik, et al., "An efficient preconditioned CG method for the solution of a class of layered problems with extreme contrasts in the coefficients," Journal of Computational Physics, vol. 152, pp. 385-403, 1999.
Vuik, et al., "The construction of projection vectors for a deflated ICCG method applied to problems with extreme contrasts in the coefficients," Journal of Computational Physics, vol. 172, pp. 426-450, 2001.
Vuik, et al., "A comparison of various deflation vectors applied to elliptic problems with discontinuous coefficients," Appl. Numer. Math., 41:219-233, 2002.
Wang, et al., "Algebraic multiscale solver for flow in heterogeneous porous media," Journal of Computational Physics, 259:284-303, 2014.
Xie, et al., "Mass conservative domain decomposition preconditioners for multiscale finite volume method," SIAM Multiscale Model. Simul., 12(4):1667-1690, 2014.
Zhou, et al., "Two-Stage Algebraic Multiscale Linear Solver for Highly Heterogeneous Reservoir Models," SPE J., SPE—141473-PA, 17(2):523-539, 2012.
International Search Report and Written Opinion for the equivalent International patent application PCT/US2016/055609 dated Jan. 26, 2017.

\* cited by examiner

RESERVOIR SIMULATION USING AN ADAPTIVE DEFLATED MULTISCALE SOLVER

CROSS-REFERENCE TO RELATED APPLICATIONS

This application claims priority to U.S. Provisional Patent Application Ser. No. 62/239,343, which was filed on Oct. 9, 2015 and is incorporated herein by reference in its entirety.

BACKGROUND

Reservoir simulations use computer models to predict the flow of fluids (e.g., oil, water, or gas) through porous media in a reservoir. Reservoir simulation can provide information that allows engineers to maximize the recovery within the oil and gas reservoirs, for example, forecasting reservoir production, informing the selection of wellbore trajectories and locations, informing the selection injection pressures, etc.

Reservoir simulations can be computationally expensive, and, thus, can take large amounts of time and processing resources to perform, particularly when many time steps are calculated, and/or short interval time steps are calculated. Accordingly, organizations want systems and methods that can perform reservoir simulations in shorter amounts of time and/or that utilize fewer processing resources.

SUMMARY

Systems, apparatus, computer-readable media, and methods are disclosed, of which the methods include performing a reservoir simulation by obtaining reservoir data, obtaining simulation parameters, determining a partial differential equation based on the simulation parameters, and performing a timestep of the reservoir simulation based on the reservoir data and the partial differential equation by removing an effect of long coherent structures with high contrasts from the partial differential equation to generate an adapted partial differential equation, and performing an algebraic multiscale method on the adapted partial differential equation to generate an approximated solution.

In some embodiments, performing the timestep of the reservoir simulation can include performing multiple iterations of removing the effect of the long coherent structures and performing the algebraic multiscale method.

In other embodiments, performing the timestep of the reservoir simulation can include manipulating the approximated solution based on the effect of the long coherent structures with high contrasts that was removed.

In further embodiments, performing the timestep of the reservoir simulation can include inputting the approximated solution into the partial differential equation and determining whether a solution of the partial differential equation converges.

In some implementations, a subsequent iteration of removing the effect of the long coherent structures and performing the algebraic multiscale method can be performed based on determining that the solution of the partial differential equation does not converge.

In other implementations, in response to determining that the solution of the partial differential equation converges, a subsequent timestep of the reservoir simulation can be processed based on the approximated solution.

In further implementations, the methods can include discretizing the partial differential equation into multiple control volumes to generate discretized partial differential equations, where performing the timestep based on the reservoir data and the partial differential equation includes performing the timestep based on the discretized partial differential equations.

In some embodiments, performing a timestep can include performing multiple timesteps, and an approximated solution can be generated for each of the timesteps, the methods can further include displaying a representation of a reservoir that includes visual indications of the approximated solutions.

In further embodiments, the reservoir simulation can include simulations of volumetric flow rates of the reservoir.

Systems and apparatus are also disclosed that include a processor and a memory system with non-transitory, computer-readable media storing instructions that, when executed by the processor, causes the systems and apparatus to perform operations that include performing a reservoir simulation by obtaining reservoir data, obtaining simulation parameters, determining a partial differential equation based on the simulation parameters, and performing a timestep of the reservoir simulation based on the reservoir data and the partial differential equation by removing an effect of long coherent structures with high contrasts from the partial differential equation to generate an adapted partial differential equation, and performing an algebraic multiscale method on the adapted partial differential equation to generate an approximated solution.

Non-transitory, computer-readable media are also disclosed that store instructions that, when executed by a processor of a computing system, cause the computing system to perform operations that include performing a reservoir simulation by obtaining reservoir data, obtaining simulation parameters, determining a partial differential equation based on the simulation parameters, and performing a timestep of the reservoir simulation based on the reservoir data and the partial differential equation by removing an effect of long coherent structures with high contrasts from the partial differential equation to generate an adapted partial differential equation, and performing an algebraic multiscale method on the adapted partial differential equation to generate an approximated solution.

The foregoing summary is intended merely to introduce a subset of the aspects of the present disclosure, and is not intended to be exhaustive or in any way identify any particular elements as being more relevant than any others. This summary, therefore, should not be considered limiting on the present disclosure or the appended claims.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the disclosure. However, it will be apparent to one of ordinary skill in the art that certain embodiments of the disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are used to distinguish one element from another. For example, a first object or step could be termed a second object or step, and, similarly, a second object or step could be termed a first object or step, without departing from the scope of the disclosure. The first object or step, and the second object or step, are both, objects or steps, respectively, but they are not to be considered the same object or step.

The terminology used in the description herein is for the purpose of describing particular embodiments and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
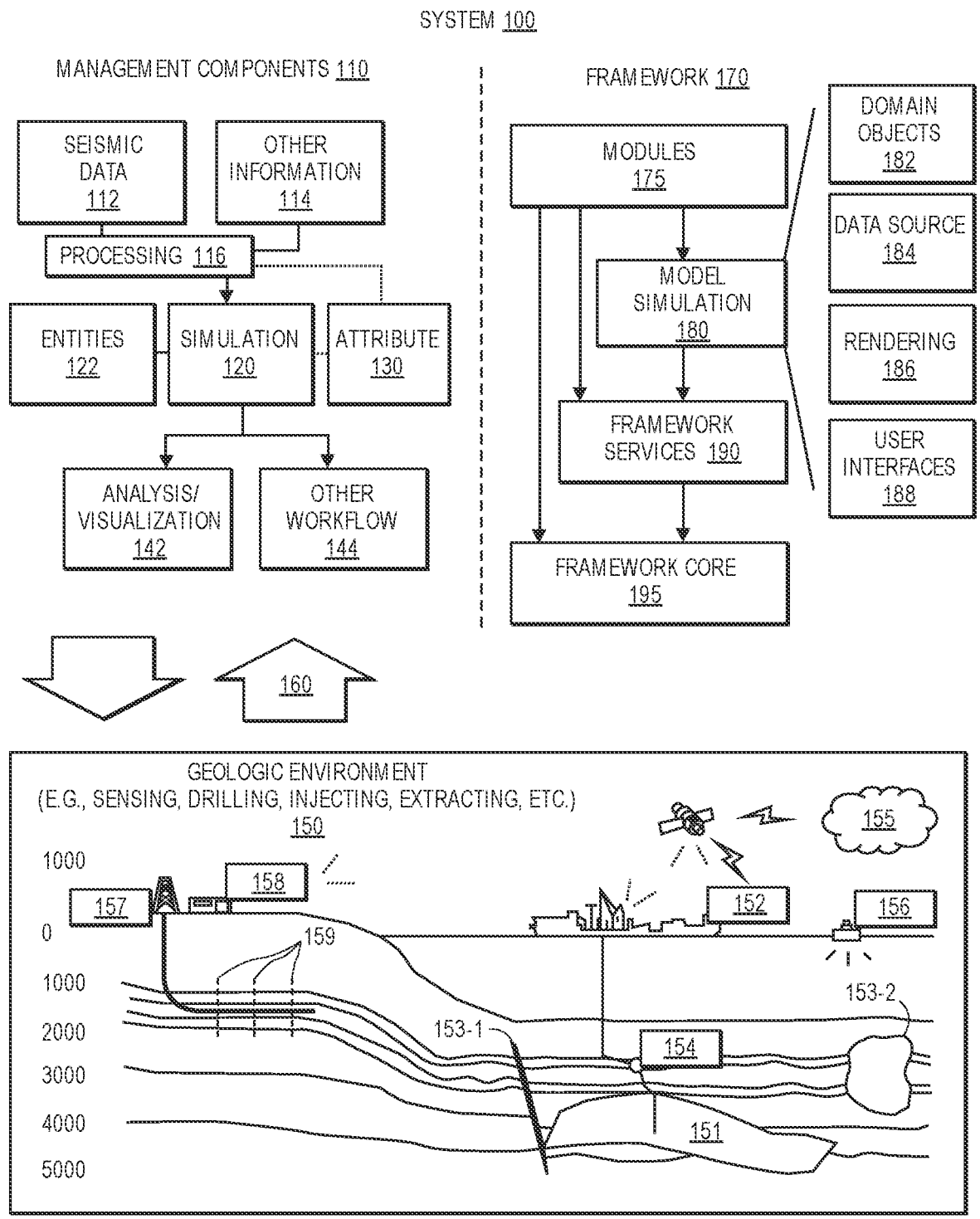
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142, and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Embodiments of the present disclosure may provide a consistent and robust numerical technique for solving linear systems of equations arising from the linearization of nonlinear parabolic or elliptic partial differential equations of fluid flow in heterogeneous anisotropic porous media. Numerical frameworks for Adaptive Deflated Multiscale Solvers (ADMS) facilitate an analysis of nonlinear problem mixed hyperbolic/parabolic partial differential equations of fluid flow in heterogeneous anisotropic porous media. Further, ADMS methods provide, for fluid flow in porous media involving heterogeneous domains with long coherent structures with high contrasts (e.g. fractures, faults, high and low permeability channels, and shale layers), a good approximation of the pressure field. In various embodiments, high contrasts can be of order $10^2$ and higher.

Accurate and efficient simulation of flow in highly heterogeneous oil reservoirs entails several challenges, one of which is due to the large scale ratios between the domain size and the resolution of the heterogeneous geological data. Traditionally, upscaling approaches have been used to obtain effective coarse-scale quantities so that the number of degrees of freedom (DOF) is reduced enough such that the problem lies within the capacity range of state-of-the-art reservoir simulators (e.g., on the order of $10^6$-$10^7$ DOF). Similar to upscaling methods, multiscale methods can be used in order to construct an accurate coarse-scale system honoring the fine-scale heterogeneous data.

The multiscale coarse-scale system is governed on the basis of locally computed basis functions, subject to reduced-dimensional boundary conditions and zero right-hand-side (RHS) terms. In contrast to upscaling methods, however, multiscale methods provide an improved solution at the original fine-scale resolution, and the multiscale finite volume (MSFV) method can deliver conservative fine-scale velocities after a local reconstruction. This addition may then allow for the calculation of the residual of the multiscale solution in fulfillment of the governing equations at the original fine-scale resolution. Thus, an iterative strategy can be developed (e.g., iterative multiscale finite volume (i-MSFV), two-scale multiscale solver (TAMS), algebraic multiscale solver (AMS), or compressible flow algebraic multiscale solver (C-AMS)) so that the multiscale error in combination with a multiscale smoother would be systematically reduced in a convergent procedure.

Previously iterative multiscale methods share the same coarse-scale system to capture the low-frequency errors, which is based on either a MSFV or multiscale finite element (MSFE) procedure. MSFE may be more efficient for highly heterogeneous channelized fields. More precisely, an AMS could be used where the MSFE and an incomplete lower upper preconditioner (ILU(0)) could resolve low and high frequency errors, respectively. This may be extended for compressible problems (C-AMS). AMS and C-AMS iterative multiscale solvers may be as efficient as an industrial Algebraic Multigrid (AMG) solver, such as SAMG. However, for highly heterogeneous anisotropic cases, the number of iterations performed by AMS and C-AMS were more than that of the SAMG. The reason can be related to the weak information in the coarse-scale system used to resolve low-frequency error modes.

An embodiment of the present disclosure may apply to fluid flow in porous media involving heterogeneous domains with long coherent structures with high contrasts (e.g. fractures, faults, high and low permeability channels, and shale layers). Therefore, the strong variations and discontinuities in the reservoir properties (i.e., large jumps) may be observed in the matrix coefficients after discretization. As a result, the underlying linearized problem may be badly-conditioned. Such severe discontinuities could lead to extreme eigenvalues of the linearized problem. Consequently, extreme eigenvalues can reduce the convergence rate of the linear solver. The deflation technique, which can be used for symmetric systems and the conjugate gradient (CG) method, can be used to overcome extreme eigenvalues by deflating problematic eigenvalues from the symmetric or non-symmetric linear system.

The performance of the multiscale methods is also affected by the presence of the large jumps in the reservoir properties. As a result, a number of different methods for improving the accuracy of the localization assumption can be used, e.g., by introducing reduced problem boundary conditions, oversampling techniques, and global information. Various adaptive deflation-based multiscale solvers (ADMS) can be used to improve the AMS convergence properties for heterogeneous domains with long coherent structures with high contrasts. The methods may separate the long features and apply an additional stage or multiple stages to the original AMS iterative stage. These additional stages are formulated based on an adaptive deflation strategy, where the "critical" subdomains are detected honoring their complex geometrical configurations. For these subdomains, global deflation-based basis functions are introduced. Then, combining AMS classical iterative strategy with an adaptive-deflated global stage allows for resolving the low frequency error modes associated with these features. The global deflation-based basis functions are constructed using a small number of approximated eigenvectors which are prolonged to the fine-scale and correspond to the smallest Ritz (or Harmonic Ritz) values. Several enriched multiscale approaches can be used, e.g., with additional spectral local problems solved in order to complement the original multiscale basis functions, from a Domain Decomposition (DD) perspective, to improve the convergence property of the local-basis-function-based coarse-scale preconditioners. Specifically, a Dirichlet-to-Neumann map problem may be solved locally to capture additional low-frequency modes which were not captured by the original multiscale coarse systems. Another approach may include detection of the "critical" subdomain, where a residual-based error criterion was used to detect the regions where the multiscale solutions could be improved. An additional coarse DOF may be added arbitrarily at the location of a high residual in order to improve the convergence properties of the i-MSFV.

The ADMS methods are adaptive in the employment of the deflation stage, with minimum change in the original AMS (or any other i-MSFV strategy) framework. Thus, the methods combine the local-basis-function-based multiscale coarse system with another global stage solver, based on the missing global information, in an efficient manner.

Governing Equations and Discretization on Fine Scale

Conservation of mass for multi-component and multi-phase fluid flow in porous media using Darcy's law leads to a system of nonlinear coupled equations for $N_c$ components distributed in $N_p$ phases, which may be written using natural variables as follows:

$$\frac{\partial}{\partial t}\left(\phi \sum_{j=1}^{N_p} x_{ij} \rho_j S_j\right) - \nabla \cdot \left(\sum_{j=1}^{N_p} x_{ij} \lambda_j \cdot (\nabla p_j + \overline{p}_j g \nabla z)\right) = q_i, \quad (1)$$

$$i = 1, \ldots, N_c; \sum_{j=1}^{N_p} S_j = 1; \sum_{i=1}^{N_c} x_{ij} = 1 \forall j = 1, \ldots, N_p \quad (2)$$

where ϕ is the porosity, $x_{ij}$ is the molar fraction of component i in phase j, $S_j, p_j, \rho_j, \bar{\rho}_j$, and $$\lambda_j = \frac{\rho_j k(S_j)}{\mu_j}$$

are phase saturation, pressure, molar density, mass density and mobilities, respectively; $k(S_j)$ and $\mu_j$ are the relative permeability and viscosity of the phase j. The gravitational acceleration is denoted by g, which acts in z direction. Moreover, $q_i$ is the component sink/source term. Mass balance of pseudo-component i=o, g, w (black-oil formulation) is considered. A sequential approach can be used to solve governing equations Equation 1 and Equation 2. The sequential approach facilitates separating the impact of a timestep sizes selection algorithm on the solution stability and convergence behaviors for both reservoir pressure (parabolic or elliptic equation) and transport governing equations (hyperbolic equations). Sequential approaches form a pressure equation which can be obtained by performing discretization on $t^n$; $t^{n+1}$ and elimination of $S_j^{n+1}$. The pressure p at $t^{n+1}$ solves (for black-oil formulation) the following equation:

$$\phi(p^{n+1}) - \sum_{j=1}^{N_p} c_i(p^{n+1}) \cdot p_j^n \cdot x_{ij}^n \cdot \phi^n \cdot S_a^n - \Delta t \sum_{j=1}^{N_p} c_i(p^{n+1}) \cdot \nabla \cdot (x_{ij} \lambda_j (\nabla p_j + \bar{p}_j g \nabla z)) = Q_i, \quad (3)$$

where $\Delta t$ is the time step, and $Q_i$ is the updated sink/source term, where:

$$c_o(p) = \rho_o^{-1}\left(1 + \frac{x_{go}}{x_{oo}}\right), c_g(p) = \rho_g^{-1}, c_w(p) = \rho_w^{-1} \quad (4)$$

are the weights (multipliers), with the assumptions that a water component is in water w phase, oil is in oil o phase, and gas splits into oil $x_{go}$ and gas $x_{gg}$=1 phases. A more general formulation and the relationship between mass fractions $x_{ij}$ and standard black-oil formulation parameters, e.g., solution gas ratio Rs, may also be provided.

In a sequential approach method, the pressure equation (parabolic or elliptic equation) can be converged for a longer time step than it is possible to converge transport solver (hyperbolic) equations. Hence, the present method solves for the pressure equation with the global timestep while applying several sub-timesteps for the transport solution. The linearized form of Equation 3 after being discretized over fine-scale control volumes leads to a non-symmetric linear system:

$$A^v p^v = b^v, \quad (5)$$

which may be iteratively solved until the converged solution is obtained. The velocity is computed from the converged solution of this system, $p^{n+1}$, which is then employed in a sequential strategy to update the component masses (or phase saturations) in a sequential strategy (i.e., Equation 1). If a fully implicit (FIM) simulation strategy is followed, Equation 3 is linearized considering the pressure and saturation dependencies in at least some equations. The resulting coupled system can then be solved simultaneously for the unknowns. In either embodiment, i.e., sequential or FIM, and in at least some other examples, an efficient and accurate solution of the pressure equation may be desired, and due to high heterogeneity contrasts with wide ranges of correlation lengths in the mobility field (i.e., rock heterogeneity), adaptive deflated multiscale solvers (ADMS) may be employed to further advance the multiscale solvers for computationally expensive cases.

Algebraic Multiscale Solver (AMS)

Consider the fine-scale linear system for pressure at a given iteration v. Denoting matrix $A^v$, pressure solution $p^v$, and the right-hand side $b^v$ for an iteration v for $A^f$, $p^f$, and $b^f$, respectively. The system of Equation 5 for iteration v can be written as:

$$A^f p^f = b^f \quad (6)$$

with a highly heterogeneous coefficient matrix. Given the multiscale system, i.e., Equation 6, multiscale solvers construct a coarse-scale system by applying a restriction operator R, solving the solution at a coarse level, and then prolonging (interpolating) it back to the original fine-scale system by using a prolongation operator P.

The prolongation operator P is constructed based on local solutions of the fine-scale problem with zero RHS terms, i.e., basis functions. The local support for the basis functions is obtained by first imposing a coarse grid ($\check{\Omega}_k$) on the given grid cells. Then selecting one coarse node inside each control volume, i.e., coarse-grid cell. By connecting the coarse nodes, the dual-coarse grid cells, which are the local supports of basis function calculations, are obtained ($\tilde{\Omega}^h$). There are $n_c$ and $n_d$ coarse and dual-coarse cells, respectively, imposed on $n_f$ fine-grid cells.

Figure 2:
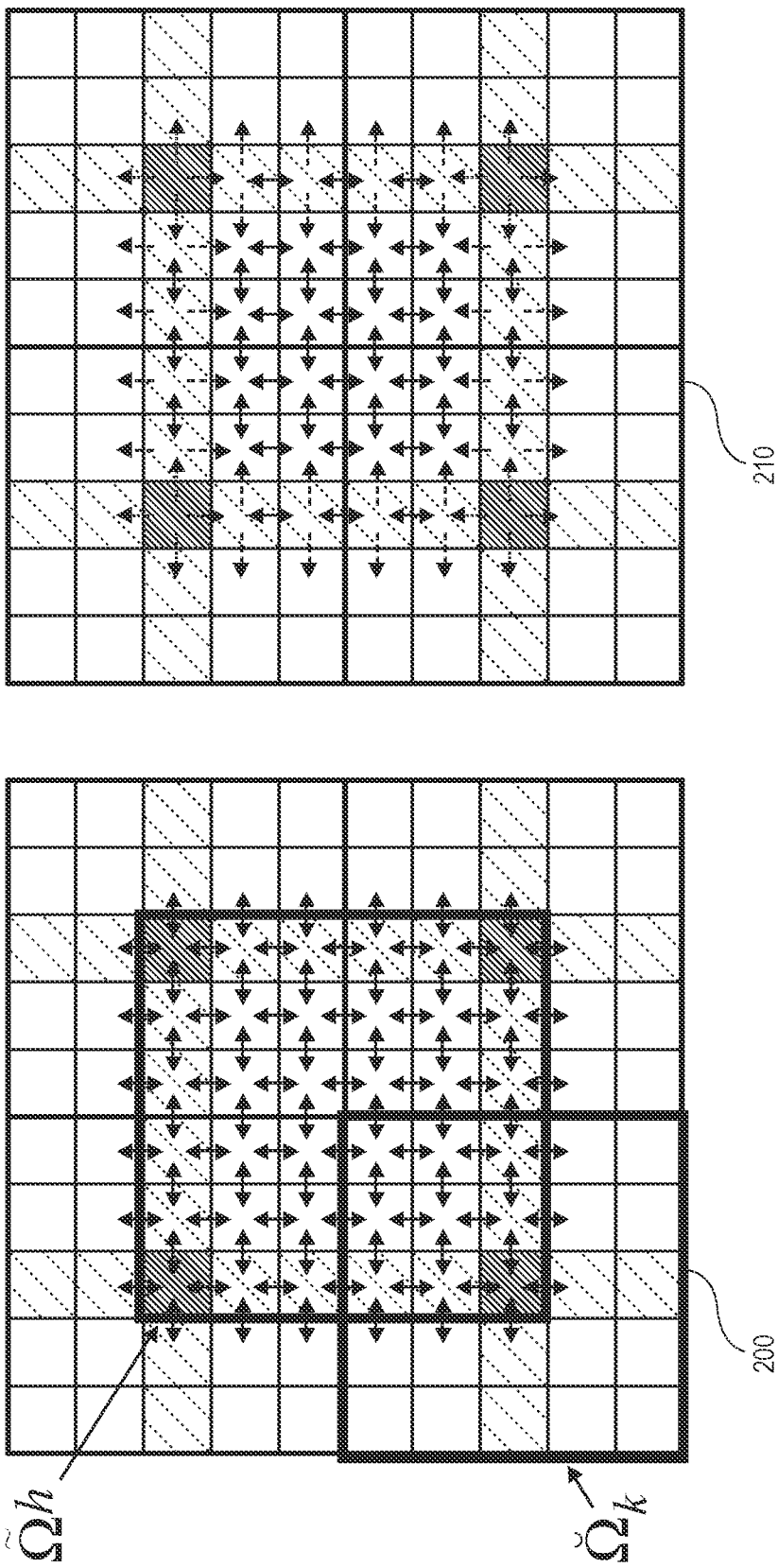
FIG. 2 illustrates an example of multiscale grids, according to an embodiment.

FIG. 2 illustrates an example of multiscale grids, according to an embodiment. As depicted in FIG. 2, grid 200 shows coarse (solid bold black lines (e.g., ($\check{\Omega}_k$)) and dual-coarse (highlighted sets of cells ($\tilde{\Omega}^h$)) grid cells. For one of the dual coarse cells, in grid 210, the flux interaction between the neighboring cells are also shown. The basis functions are calculated subject to a reduced-dimensional boundary condition which is shown in the grid 210 by single-headed arrows. The direction of the arrows at the edge cells show that the solution of the reduced-dimensional problem for the boundary cells is used as a Dirichlet condition for the interior of the dual cells.

Basis functions $\Phi_k^h$ are solved over dual-coarse cell $\tilde{\Omega}^h$, having coarse nodes k on their corners. A coarse node k belongs to several (four in 2D and eight in 3D on rectangular Cartesian grids) dual cells, thus an assembling procedure can lead to having a basis function A belonging to node k which can be obtained by:

$$\Phi_k = \sum_{h=1}^{n_d} \Phi_k^h. \quad (7)$$

By construction, basis function $\Phi_k^h$ out of dual cell h is set to zero, i.e., local supports are imposed. The prolongation operation P is then populated in a way that basis function $\Phi_k$ is stored in its k-th column, i.e.:

$$P_{i,k} = \Phi_k(x_i). \quad (8)$$

Once the basis functions are calculated, the prolongation operator may be constructed, the coarse system:

$$A^c p^c = RA^f P p^c = Rb^f \quad (9)$$

is obtained and solved for $n_c$, coarse pressure unknowns $p^c$. The coarse-scale solution is then prolonged back to the original fine scale, i.e.:

$$p' = Pp^c \quad (10)$$

The multiscale procedure can, therefore, be summarized as finding an approximate solution of fine-scale system, i.e., $p^f = (A^f)^{-1} b^f$, as:

$$p^f \approx p' = Pp^c = \underbrace{P(RA^f P)^{-1} R}_{M^{-1}} b^f. \quad (11)$$

The restriction operator, i.e., mapping fine scale to coarse scale, can be obtained by using either finite element (MSFE) or finite volume (MSFV) methods. The former employs a transpose of the prolongation operator, i.e., $$R_{FE} = P^T \quad (12)$$

and the latter employs a conservative integration (which may then convert the volume integration to surface flux integrations) as:

$$(R_{FV})_{kj} = \begin{cases} 1, & \text{if cell } j \in \breve{\Omega}_k \\ 0, & \text{otherwise} \end{cases} \quad (13)$$

Multiscale methods can be used to describe local heterogeneities within the sub-domains in the coarse system by using locally-supported basis functions. However, embodiments of the present disclosure may construct one or more global basis functions to allow for more efficient treatment of low-frequency error modes. The number of additional global basis functions may remain small (in contrast to the many local basis functions), and obtained on the basis of the deflation theory. Subsequently, the restriction and prolongation operators in the ADMS algorithms can be constructed.

Deflation Theory

The basic properties of the deflation method for the non-symmetric case are presented herein. Let $A^f \in \mathbb{R}^{n \times n}$ be the non-symmetric linear system matrix equation 6, and assume that the deflation matrix $Z \in \mathbb{R}^{n \times d}$ with d deflation vectors is given. Then the matrix $D \in \mathbb{R}^{d \times d}$ is defined as:

$$D = Z^T A^f Z, \quad (14)$$

and the deflation projector matrices (operators) $P_1$ and $P_2$ are defined as $$P_1 = I - A^f Z D^{-1} Z^T,$$

$$P_2 = I - Z D^{-1} Z^T A^f. \quad (15)$$

Inverting D may be relatively computationally cheap if $d \ll n$. The pressure solution $p^f$ to Equation 6 may be constructed using two parts:

$$p^f = (I - P_2) p^f + P_2 p^f \quad (16)$$

The first part can be simplified because $(I-P_2) p^f = ZD^{-1} Z^T A^f p^f = ZD^{-1} Z^T b^f$ removes dependency on $p^f$. For the second part, $P_2 \hat{p}^f = P_2 p^f$, where $\hat{p}^f$ is a solution of the 'deflated system':

$$P_1 A^f \hat{p}^f = P_1 b^f \quad (17)$$

Thus, the solution to the original linear system can be found using the relation:

$$p^f = ZD^{-1} Z^T b^f + P_2 \hat{p}^f \quad (18)$$

Adaptive Deflated Multiscale Solver (ADMS)

The ADMS can be used to construct a coarse pressure system in at least three ways: (1) a fully deflated method, (2) a decoupled deflated method, and (3) a mixed deflated method.

Fully ADMS (F-ADMS)

A Fully ADMS method may employ prolongation P and restriction R operators described above and applied to the deflated system equation 17 as follows:

$$RP_1 A^f P \hat{p}^c = RP_1 b^f, \hat{p}^c = (RP_1 A^f P)^{-1} RP_1 b^f \quad (19)$$

The coarse system is solved to obtain $\hat{p}^c$ and the final solution can be reconstructed as follows:

$$p^f \approx p' = ZD^{-1} Z^T b^f + P_2 P \hat{p}^c = \underbrace{[ZD^{-1} Z^T + P_2 P(RP_1 A^f P)^{-1} RP_1]}_{M_{F-ADMS}^{-1}} b^f \quad (20)$$

The operator in the Additive Schwarz Method with deflation correction can be written as:

$$M_{ASM}^{-1} = ZD^{-1} Z^T + \Sigma R_i^T (R_i A R_i^T)^{-1} R_i \quad (21)$$

where $R_i$ is the restriction operator to the overlapping domain. The structure of the operators $M_{ASM}^{-1}$ and $M_{F-ASM}^{-1}$ are different due to the presence of the deflation projector operators $P_1$ and $P_2$.

Decoupled ADMS (D-ADMS)

In light of the structure of the operators $M_{ASM}^{-1}$, it is possible to use the decoupled ADMS method (D-ADMS) constructed as follows:

$$p^f \approx p' = \underbrace{[ZD^{-1} Z^T + P(RA^f P)^{-1} R]}_{M_{D-ADMS}^{-1}} b^f \quad (22)$$

Mixed ADMS (M-ADMS)

Mixed ADMS employs an enriched set of basis functions to map between fine and coarse scales. This extended set involves the conventional multiscale local basis functions and globally constructed deflation vectors. Hence, the global prolongation operator P is constructed such that it includes the original prolongation operator and the deflation operator:

$$\hat{P} = [P; Z] \quad (23)$$

Furthermore, the restriction operator may be defined as:

$$\hat{P}^T = ([P; Z])^T \quad (24)$$

The multiscale procedure in this can be written as:

$$p^f \approx \underbrace{\hat{P}(\hat{P}^T A^f \hat{P})^{-1} \hat{P}^T}_{M_{M-ADMS}^{-1}} b^f \quad (25)$$

The mixed adapted deflated multiscale operator $M_{M-ASM}^{-1}$ may be different from the operators $M_{ASM}^{-1}$, $M_{D-ASM}^{-1}$ and $M_{F-ASM}^{-1}$. These methods may depend on the underlying construction of the deflation vectors. Different methods of constructing deflation vectors are described below. In some embodiments, the deflation vectors are constructed approximately. Hence, any number of pre- and post-smoothing iterations can be performed to mitigate and/or remove any undesirable frequencies. Furthermore, $M_{M-ASM}^{-1}$ and $M_{F-ASM}^{-1}$ can be preconditioners with some iterative accelerator.

Deflation Vectors

A number of approaches to compute the deflation subspace Z can be used, with varying degrees of effectiveness depending on the application. Let $\Omega$ be the computational domain, which is divided into d non-overlapping subdomains $\Omega_j$, j=1, . . . , d. After discretization, denoted by subscript h, let $x_i$ be a grid point in the discretized domain $\Omega_{h_j}$. For example, the following methods may be employed to define deflation vectors.

Domain Decomposition Deflation Vectors

In this approach, the discretized computational domain $\Omega$ is first decomposed into d non-overlapping subdomains $\overline{\Omega}_j$ with $j \in \{1, \ldots, d\}$. The deflation vector $\overline{Z}_j$ forms the j-th column of the deflation operator Z, corresponding to $\overline{\Omega}_j$ and is defined as:

$$(Z_j)_i = \begin{cases} 1, & x_i \in \overline{\Omega}_j \\ 0, & x_i \in \Omega \setminus \overline{\Omega}_j \end{cases} \quad (26)$$

where $x_j$ is a fine-scale grid cell center. Based on this definition, $Z_j$ are piecewise-constant vectors, disjoint and orthogonal. For this choice of the deflation subspace, the deflation projectors $P_1$ and $P_2$ function to agglomerate each subdomain in a single cell. Hence, subdomain deflation is closely related to domain-decomposition methods and multigrid. For problems in bubbly flow, the span of the deflation vectors, Equation 26 approximates the span of the eigenvectors corresponding to the smallest eigenvalues. In some cases, the subdomains can be defined using the underlying heterogeneity, e.g., a low permeable region can be separated from the high-permeable regions and form d decompositions. In some embodiments, the subdomains may be overlapped. This may be accomplished using a weighted overlap method, which mimics average, and a no overlap method in the case of no contrasts and large contrasts, respectively. The overlap may facilitate approximating the eigenvectors corresponding to the extreme eigenvalues.

In highly heterogeneous computational domains with large jumps in the permeability field, the subdomain-levelset deflation may be used. In this case, where subdomain deflation does not take jumps into account, the subdomain-levelset deflation identifies different regions in the domain with similar properties.

Figure 3:
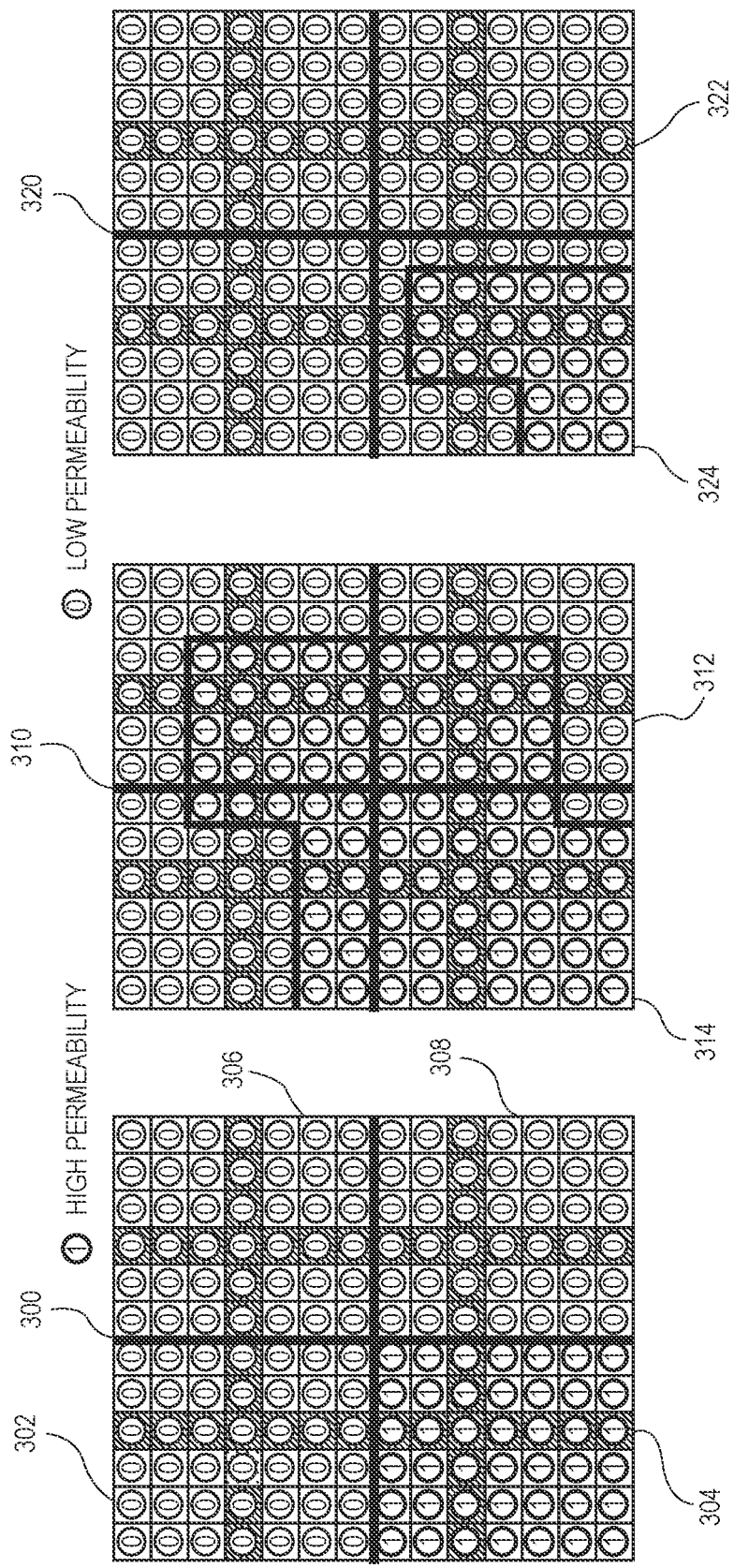
FIG. 3 illustrates an example of domain grids where subdomain deflation, levelset deflation, and subdomain-levelset deflation are used, according to an embodiment.

FIG. 3 illustrates an example of domain grids where subdomain deflation, levelset deflation, and subdomain-levelset deflation are used, according to an embodiment.

As shown in FIG. 3, the fine grid in grids 300, 310, 320 is 12×14 and the coarse grid is 2×2. In each case, the values shown on the fine cells correspond to the values in the first deflation vector. In grid 310 and grid 320, the border between the high permeability circles (1) and low permeability circles (0) illustrates a sharp contrast in the matrix coefficient.

In grid 300, subdomain deflation is used. A solid line is shown, dividing the domain into the four subdomains 302 ($\overline{\Omega}_1$), 304 ($\overline{\Omega}_2$), 306 ($\overline{\Omega}_3$), and 308 ($\overline{\Omega}_4$). Each subdomain corresponds to a unique deflation vector.

In grid 310, levelset deflation is used. The solid line coincides with the contrast in the matrix coefficient. As a result, there are the two domains 312 ($\overline{\Omega}_1$) and 314 ($\overline{\Omega}_2$).

In grid 320, subdomain-levelset deflation is used. The subdomain division is determined using certain criteria, which in this example leads to the solid line division between 322 ($\overline{\Omega}_1$) and 324 ($\overline{\Omega}_2$). Within each subdomain, levelset deflation uses the jump between the high permeability and low permeability cells to obtain the subdomains $\overline{\Omega}_1$, $\overline{\Omega}_2$, $\overline{\Omega}_3$, and $\overline{\Omega}_4$.

In an embodiment, the serial implementation of the subdomain-levelset deflation method may be used, as it may be particularly suitable for a parallel implementation. The levelset deflation method may be applied to each subdomain (coarse cells), and the deflation vectors may be appended with zeros for cells outside the neighboring subdomains. Furthermore, deflation vectors can be constructed based on the jump in the pressure, volume, and temperature (PVT) data (e.g., bubbly flow). For example, during the polymer flooding, the aqueous viscosity changes in the presence of polymer. Hence, the deflation vectors can be constructed based on the location of the polymer with in the reservoir.

The above deflation operator may be based on the analysis of the fine scale operator spectrum.

Ritz Vectors

To approximate some eigenvectors v of the fine scale operator $A^f$ with corresponding eigenvalues $\theta$, the following conditions may be used:

$$\check{Z}^T(A^f - \hat{\theta} 1)\overline{Z}_y = 0; \check{Z}^T Z = 1, \check{Z}^T = (\overline{Z}^T \overline{Z})^{-1} \cdot \overline{Z}^T, v = \overline{Z}_y, \hat{\theta} \approx \theta \quad (27)$$

where $\overline{Z}$ are the domain-based deflation vectors defined by Equation 26. The Ritz vectors v approximate the eigenvectors of $A^f$. Moreover, the Ritz values $\hat{\theta}$ tend to approximate the eigenvalues of $A^f$ (i.e., $\hat{\theta} \approx \theta$). Therefore, the d approximated eigenvectors v corresponding to the d smallest Ritz values $\hat{\theta}$ may be taken as the columns of deflation operator Z which forms the final deflation operator.

Harmonic Ritz Vectors

The Ritz vectors above can be formed by imposing a Galerkin projection. The harmonic Ritz vectors v* are obtained by using the Petrov-Galerkin orthogonality conditions. For the approximation of the eigenvectors of the original problem, the following relations can be used:

$$(A^f \overline{Z})^T (A^f v^* - \theta^* I v^*) = 0, v^* = \overline{Z} y \quad (28)$$

Although $\overline{Z}$ may not be sparse, the Harmonic Ritz vectors can be computed at a relatively small cost. Since the user may specify how many vectors should be included in the deflation operator, the method may have a black-box nature. Again, the d approximated eigenvectors v* correspond to the d smallest Ritz values $\theta^*$ of the columns of the deflation operator Z, which forms the final deflation operator.

The methods described herein can employ the M-ADMS method to perform numerical simulation using the above-describes methods of construction of a deflation operator, although this is not to be considered limiting.

Figure 4:
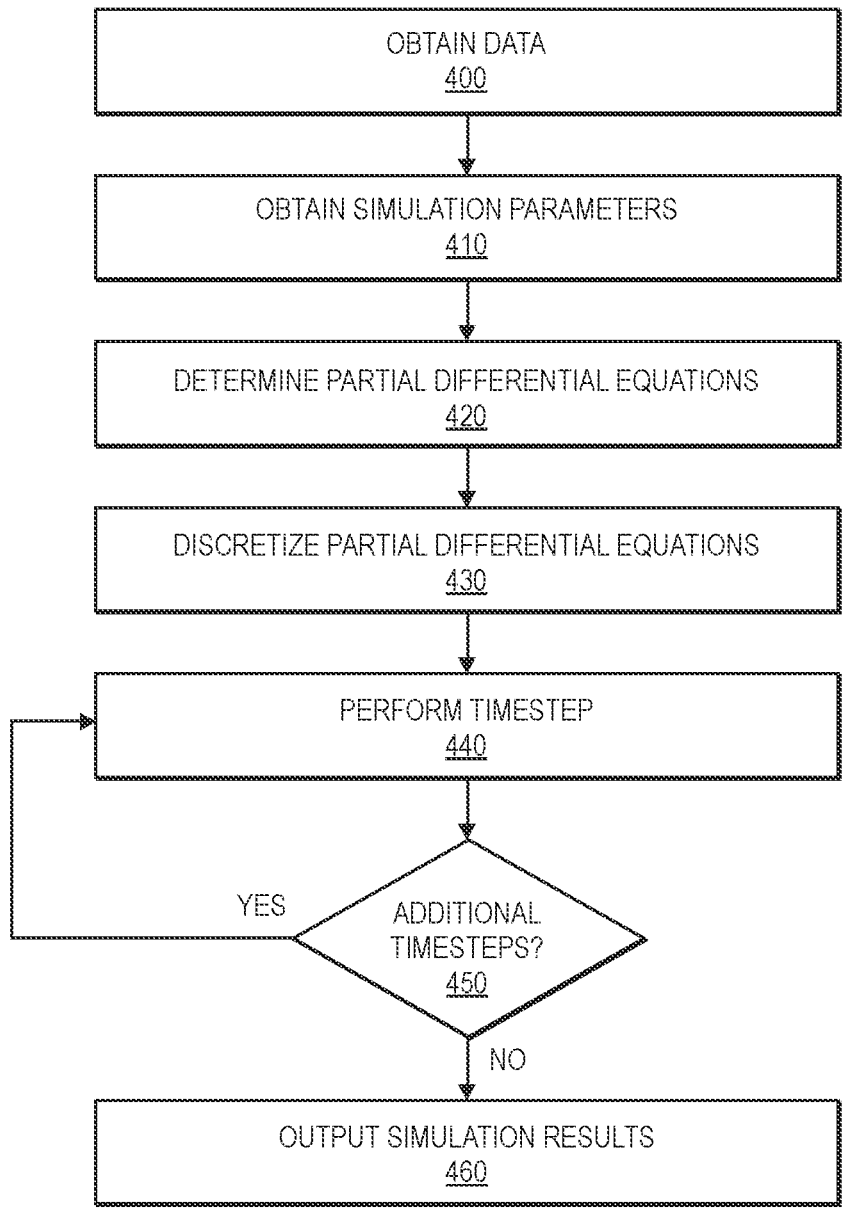
FIG. 4 illustrates an example of a method for performing a reservoir simulation, according to an embodiment.

FIG. 4 illustrates an example of a method for performing a reservoir simulation, according to an embodiment. In various embodiments, the reservoir simulation can be used to, for example, maximize reservoir exploitation. In some embodiments, the example method illustrated in FIG. 4 can be performed using a computing device that includes the framework (e.g., framework 170) and the management components (e.g., management components 110) described above with reference to FIG. 1.

The example method can begin in 400, when the computing device obtains data representing the area (e.g., metrics of a subterranean formation, such as a reservoir) that is being simulated (e.g., in the form of a mesh). The data may include measured properties of a reservoir determined using, for example, core samples, seismic analysis, nuclear magnetic resonance, gamma ray logging, any other type of well logging, etc. Such properties can be collected using devices such as well-logging tools, sensors deployed into a wellbore, logging-while-drilling devices, seismic receivers (e.g., geophones), imaging devices, etc. Measured properties can include, for example, rock type, porosity, permeability, pore volume, volumetric flow rates, well pressure, gas/oil ratio, composition of fluid in the reservoir, etc.

In 410, the computing device can obtain simulation parameters. For example, the simulation parameters can indicate physical properties of the reservoir that are to be simulated (e.g., volumetric flow rates, well pressure, gas/oil ratio, composition of fluids, etc.). For example, the simulation parameters can be received from a user.

In 420, the computing device can determine the governing equations (e.g., partial differential equations) to apply to the data based on, for example, the obtained simulation parameters. In some embodiments, the physical properties that are to be simulated can be used to determine a type of model and corresponding partial differential equations that will be used for the simulation.

For example, the computing device can initialize a black-oil model, a compositional model, a thermal model, an IMPES model (or implicit, sequential, adaptive implicit models), a single-porosity model, a dual-porosity model, etc. Thus, the computing device can determine and/or obtain the partial differential equations that correspond to the initialized model.

As an additional example, the computing device can initialize a generalized reservoir model that includes one or more specific types of reservoir models, and can determine and/or obtain the corresponding partial differential equations.

In 430, the computing device can discretize the partial differential equations based on the data. In some embodiments, the computing device can discretize the partial differential equations using the Finite Volume Method (FVM). For example, the computing device can define control volumes within a mesh where a variable of interest is located at the centroid of the control volume, and the computing device can integrate the differential form of the governing equations over each control volume, resulting in discretized equations.

In 440, the computing device can perform a timestep using the discretized equations. For example, a first timestep can be performed by inputting initial physical properties from the data received in 400 and outputting an approximation of the physical properties at the end of the timestep. As a further example, subsequent timesteps can be performed by inputting the approximation of the physical properties at the end of a previous timestep and outputting an approximation of the physical properties at the end of the current timestep.

In some embodiments, a timestep can be performed in one or more iterations, as described below with regard to FIG. 5.

In 450, the computing device can determine if there are additional timesteps to perform. If there are additional timesteps to perform (450, YES), the process can return to 440 and the computing device can perform the next timestep. If there are no additional timesteps to perform (450, NO), the computing device can proceed to 460 and output the simulation results, which can include the approximations of the physical properties at the end of each timestep.

In various embodiments, outputting the simulation results can include, for example, displaying a representation of the reservoir on the computing device (e.g., a two-dimensional or a three-dimensional rendering) that includes visual indications of the simulation results (e.g., volumetric flow rates).

Figure 5:
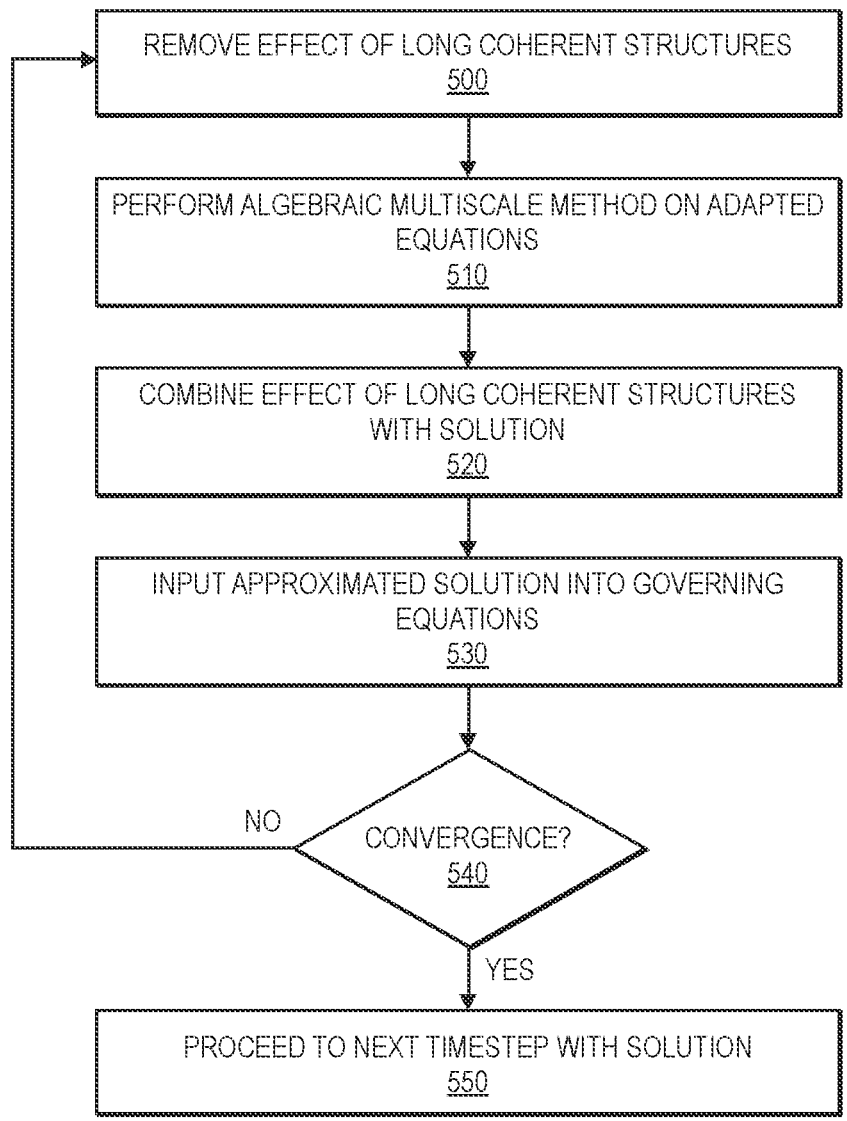
FIG. 5 illustrates an example of a method for performing a timestep of a reservoir simulation, according to an embodiment.

FIG. 5 illustrates an example of a method for performing a timestep of a reservoir simulation, according to an embodiment. In various embodiments, the reservoir simulation can be used to, for example, maximize reservoir exploitation. In some embodiments, the example method illustrated in FIG. 5 can be performed using a computing device that includes the framework (e.g., framework 170) and the management components (e.g., management components 110) described above with reference to FIG. 1. In various implementations, FIG. 5 can correspond performing a timestep, as described in 440 above.

The example method can begin in 500, when the computing device removes the effect of long coherent structures with high contrasts (e.g. fractures, faults, high and low permeability channels, and shale layers) from discretized partial differential equations (e.g., as created in 430 described above). In some embodiments, the computing device can remove the effect of the long coherent structures using a deflation technique to overcome extreme eigenvalues by deflating extreme eigenvalues from the partial differential equations, as described above. For example, the computing device can construct a coarse-scale system by applying a restriction operator to the discretized partial differential equations (a fine-scale system). As a result, the computing device can generate adapted partial differential equations.

In 510, after the effect of the long coherent structures has been removed, the computing device can perform an algebraic multiscale method on the adapted partial differential equations to solve the adapted partial differential equations (i.e., to generate an approximated solution). For example, the computing device can perform the Newton-Raphson method on the adapted partial differential equations.

Because the effect of the long coherent structures increases the complexity of the partial differential equations, performing an algebraic multiscale method with the complex partial differential equations (prior to deflation) can consume large amounts of processing resources and/or processing time. Thus, by first removing the effect of the long coherent structures and then performing the algebraic multiscale method, the amount of processing resources and processing time can be reduced.

In 520, the computing device can combine the solution of the adapted partial differential equations with the effect of the long coherent structures with high contrasts that was removed in 500. For example, the computing device can algebraically manipulate the solution based on values corresponding to the deflation in 500 (e.g., a prolongation operator, as described above).

Accordingly, by solving the solution at a coarse level, and then prolonging (interpolating) the solution back to the original fine-scale system the effect of the long coherent structures can be approximated in the solution without having to expend the processing resources to compute partial differential equations with extreme eigenvalues.

In 530, the approximated solution can be inputted into the governing equations.

If, in 540, the solution does not converge (e.g., is not equal to zero or is not within a threshold range of zero) (540, NO), the process can return to 500 and a subsequent iteration can be performed. In the subsequent iteration, the deflation of the extreme eigenvalues and/or the combination of the solution of the adapted partial differential equations with the effect of the long coherent structures with high contrasts that was removed can be adjusted to improve the approximation. In various embodiments, the adjustments can be made based on the how close the solution is to convergence.

If, in 540, the solution converges (e.g., is equal to zero or is within a threshold range of zero) (540, Yes), the process can proceed to 550 and the computing device can proceed to a subsequent timestep (e.g., 440 in FIG. 2) or output the simulation results (e.g., 460 in FIG. 2) as described above.

Accordingly, iterations of 500-540 can be performed until the solution converges or until a threshold number of iterations are performed. If the solution converges, the solution can be used as initial values for the next timestep in sequence. In some implementations, if the solution does not converge then, for example, once a threshold number of iterations are performed, a solution that is closest to convergence can be used for the next timestep. In other implementations, if the solution does not converge then, for example, the algebraic multiscale method can be performed on the partial differential equations to determine a solution that can be used in the next timestep.

Figure 6:
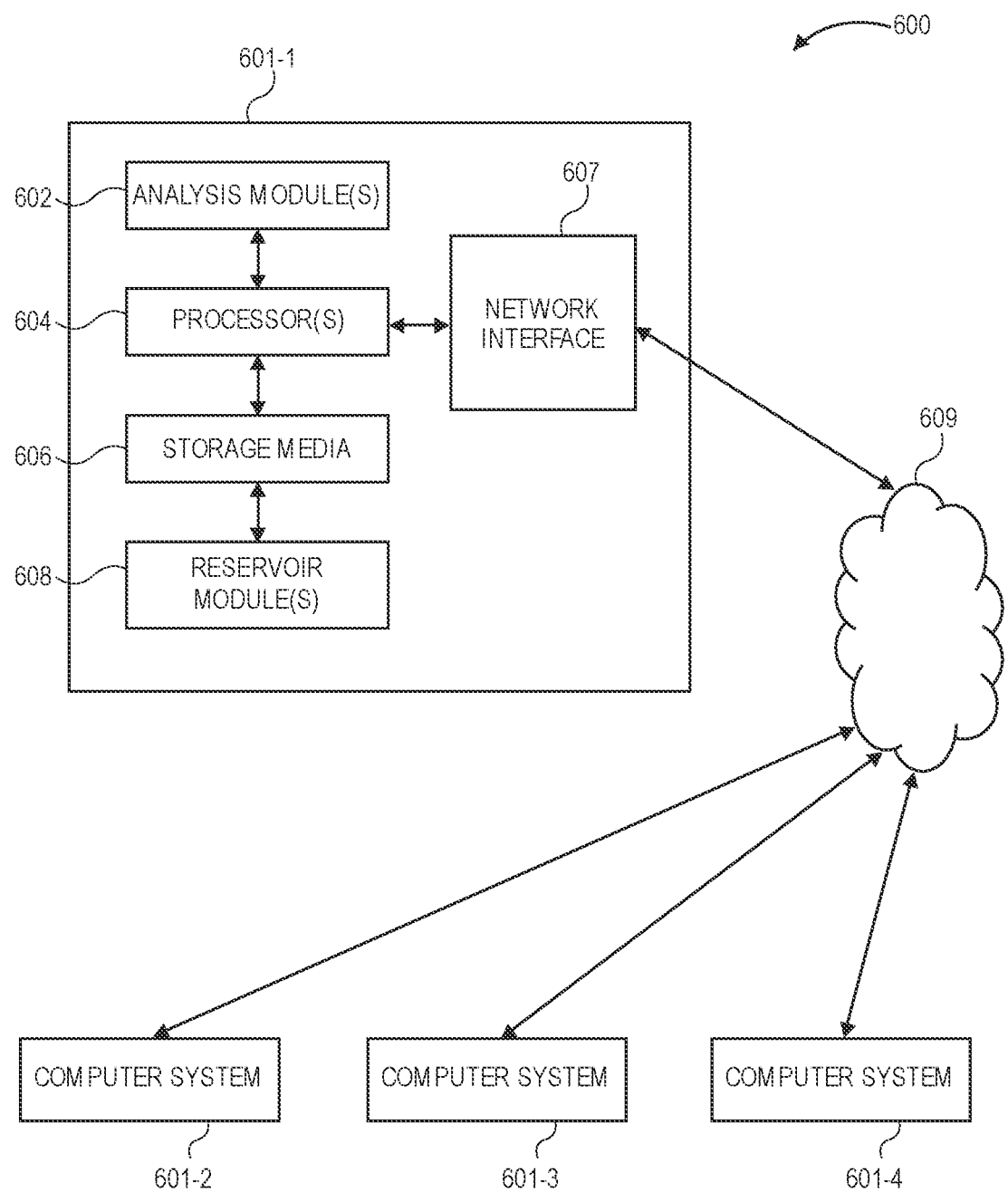
FIG. 6 illustrates an example computing system that may execute methods of the present disclosure, according to an embodiment.

In some embodiments, the methods of the present disclosure may be executed by a computing system. FIG. 6 illustrates an example of such a computing system 600, in accordance with some embodiments. The computing system 600 may include a computer or computer system 601-1, which may be an individual computer system 601-1 or an arrangement of distributed computer systems. The computer system 601-1 includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601-1 to communicate over a data network 609 with one or more additional computer systems and/or computing systems, such as 601-2, 601-3, and/or 601-4 (note that computer systems 601-2, 601-3, and/or 601-4 may or may not share the same architecture as computer system 601-1, and may be located in different physical locations, e.g., computer systems 601-1 and 601-2 may be located in a processing facility, while in communication with one or more computer systems such as 601-3 and/or 601-4 that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601-1, in some embodiments, storage media 601-1 may be distributed within and/or across multiple internal and/or external enclosures of computing system 601-1 and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains reservoir simulation module(s) 608 for obtaining and storing reservoir data, generating models, discretizing partial differential equations, performing timesteps (e.g., in one or more iterations), removing the effect of long coherent structures, performing algebraic multiscale methods, combining the effect of the long coherent structures with solutions to the algebraic multiscale methods, etc. In the example of computing system 600, computer system 601-1 includes the reservoir simulation module 608. In some embodiments, a single reservoir simulation module may be used to perform aspects of one or more embodiments of the methods disclosed herein. In alternate embodiments, a plurality of reservoir simulation modules may be used to perform aspects of methods disclosed herein.

It should be appreciated that computing system 600 is one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the disclosure.

Geologic interpretations, models, and/or other interpretation aids may be refined in an iterative fashion; this concept is applicable to the methods discussed herein. This may include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limited to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to explain principals of the disclosure and practical applications, to thereby enable others skilled in the art to utilize the disclosure and various embodiments with various modifications as are suited to the particular use contemplated.

What is claimed is:

1. A method, comprising:
obtaining reservoir data at least partially representing a subsurface volume;
obtaining simulation parameters;
determining a partial differential equation based on the simulation parameters;
performing a timestep of a reservoir simulation based on the reservoir data and the partial differential equation, by:
removing an effect of long coherent structures with high contrasts from the partial differential equation to generate adapted partial differential equation, wherein removing comprises constructing one or more basis functions using a deflation technique; and
performing an algebraic multiscale method on the adapted partial differential equation to generate an approximated solution; and
generating a visual model of the subsurface volume based at least in part on the approximated solution.

2. The method of claim 1, wherein performing the timestep of the reservoir simulation comprises performing a plurality of iterations of removing the effect of the long coherent structures and performing the algebraic multiscale method.

3. The method of claim 1, wherein performing the timestep of the reservoir simulation further comprises manipulating the approximated solution based on the effect of the long coherent structures with high contrasts that was removed.

4. The method of claim 1, wherein performing the timestep of the reservoir simulation further comprises inputting the approximated solution into the partial differential equation and determining whether a solution of the partial differential equation converges.

5. The method of claim 4, wherein a subsequent iteration of removing the effect of the long coherent structures and performing the algebraic multiscale method is performed based on determining that the solution of the partial differential equation does not converge.

6. The method of claim 4, further comprising, in response to determining that the solution of the partial differential equation converges, processing a subsequent timestep of the reservoir simulation based on the approximated solution.

7. The method of claim 1, further comprising discretizing the partial differential equation into a plurality of control volumes to generate discretized partial differential equations, wherein performing the timestep based on the reservoir data and the partial differential equation comprises performing the timestep based on the discretized partial differential equations.

8. The method of claim 1, wherein:
performing a timestep comprises performing a plurality of timesteps; and
an approximated solution is generated for each of the plurality of timesteps.

9. The method of claim 8, wherein the reservoir simulation comprises simulations of volumetric flow rates of the reservoir.

10. The method of claim 1, wherein the long coherent structures with high contrasts comprise one or more of fractures, faults, high and low permeability channels, or shale layers.

11. The method of claim 1, further comprising combining the approximated solution with the effect that was removed to calculate a simulation solution, wherein the visual model that is generated is based on the simulation solution, and wherein the model includes one or more visual indications of the simulation results.

12. The method of claim 1, wherein the one or more basis functions at least partially represent the effect, and wherein using the deflation technique comprises deflating one or more eigenvalues from the partial differential equation.

13. The method of claim 1, further comprising enhancing reservoir exploitation based at least in part on the visual model.

14. A computing system comprising:
one or more processors; and
a memory system comprising one or more non-transitory, computer-readable media storing instructions that, when executed by at least one of the one or more processors, cause the computing system to perform operations, the operations comprising:
obtaining reservoir data at least partially representing a subsurface volume;
obtaining simulation parameters;
determining a partial differential equation based on the simulation parameters;
performing a timestep of a reservoir simulation based on the reservoir data and the partial differential equation, by:
removing an effect of long coherent structures with high contrasts from the partial differential equation to generate adapted partial differential equation wherein removing comprises constructing one or more basis functions using a deflation technique; and
performing an algebraic multiscale method on the adapted partial differential equation to generate an approximated solution; and
generating a visual model of the subsurface volume based at least in part on the approximated solution.

15. The system of claim 14, wherein performing the timestep of the reservoir simulation comprises performing a plurality of iterations of removing the effect of the long coherent structures and performing the algebraic multiscale method.

16. The system of claim 14, wherein performing the timestep of the reservoir simulation further comprises manipulating the approximated solution based on the effect of the long coherent structures with high contrasts that was removed.

17. The system of claim 14, wherein performing the timestep of the reservoir simulation further comprises inputting the approximated solution into the partial differential equation and determining whether a solution of the partial differential equation converges.

18. The system of claim 17, wherein a subsequent iteration of removing the effect of the long coherent structures and performing the algebraic multiscale method is performed based on determining that the solution of the partial differential equation does not converge.

19. The system of claim 17, the operations further comprising, in response to determining that the solution of the partial differential equation converges, processing a subsequent timestep of the reservoir simulation based on the approximated solution.

20. The system of claim 14, the operations further comprising discretizing the partial differential equation into a plurality of control volumes to generate discretized partial differential equations, wherein performing the timestep based on the reservoir data and the partial differential equation comprises performing the timestep based on the discretized partial differential equations.

21. The system of claim 14, wherein:
performing a timestep comprises performing a plurality of timesteps; and
an approximated solution is generated for each of the plurality of timesteps, the operations further comprising displaying a representation of a reservoir that includes visual indications of the approximated solutions.

22. The system of claim 21, wherein the reservoir simulation comprises simulations of volumetric flow rates of the reservoir.

23. A non-transitory, computer-readable medium storing instructions that, when executed by one or more processors of a computing system, cause the computing system to perform operations, the operations comprising:
obtaining reservoir data at least partially representing a subsurface volume;
obtaining simulation parameters;
determining a partial differential equation based on the simulation parameters;
performing a timestep of a reservoir simulation based on the reservoir data and the partial differential equation, by:
removing an effect of long coherent structures with high contrasts from the partial differential equation to generate adapted partial differential equation, wherein removing comprises constructing one or more basis functions using a deflation technique; and
performing an algebraic multiscale method on the adapted partial differential equation to generate an approximated solution; and
generating a visual model of the subsurface volume based at least in part on the approximated solution.

* * * * *